United States Patent [19]

Ryan

[11] 4,091,445
[45] May 23, 1978

[54] PROGRAM SWITCHING MONITOR

[75] Inventor: Charles P. Ryan, Phoenix, Ariz.

[73] Assignee: Honeywell Information Systems Inc., Waltham, Mass.

[21] Appl. No.: 760,300

[22] Filed: Jan. 18, 1977

[51] Int. Cl.² ............................................. G06F 9/00
[52] U.S. Cl. ..................................................... 364/200
[58] Field of Search ................................ 364/200, 900

[56] References Cited

U.S. PATENT DOCUMENTS

| 3,398,405 | 8/1968 | Carlson et al. | 364/200 |
| 3,528,062 | 9/1970 | Lehmann et al. | 364/200 |
| 3,839,706 | 10/1974 | Borchsenius | 364/200 |

*Primary Examiner*—Harvey E. Springborn
*Attorney, Agent, or Firm*—Faith F. Driscoll; Nicholas Prasinos; Ronald T. Reiling

[57] ABSTRACT

A program switching monitor is provided with means for preventing a central processing unit operating under control of a first program from switching to another program until certain conditions are met. Upon receipt of indications or data representative of the fact that all commands issued while the unit was operating under the control of the first program have been accounted for, program switching is permitted.

5 Claims, 4 Drawing Figures

PROGRAM SWITCHING MONITOR

The following cases assigned to the same assignee and filed on the same date are incorporated herein by reference.

(1) Apparatus and Method for the Transfer of Data Characters invented by Charles W. Ferrell and Robert M. Barton and having Ser. No. 760,474, filed Jan. 18, 1977.

(2) Apparatus and Method for Data Transfer invented by Charles W. Ferrell and Robert M. Barton and having Ser. No. 760,473, filed Jan. 18, 1977.

BACKGROUND OF THE INVENTION

The present invention relates in general to new and improved monitoring apparatus for use in a data processing system, in particular to apparatus for monitoring the switching of a central processing unit from one program to another and for preventing such switching until the requirements of the first program have been fully satisfied.

In data processing systems, it is common practice for a central processing unit operating under control of a particular program to switch to another program, or programs, in the course of a relatively brief time interval. When such is the case, it is important that any status reports sent back to the CPU pursuant to operations carried out by it, apply to the same program under the control of which the CPU is operating when carrying out the operations in question.

For example, where the CPU, operating under a first program, sends out Read Commands to the memory of the data processing system, care must be taken that the Read Data so collected is matched up with the Read Command. Similarly, when a Write Command is issued while the CPU is operating under the first program, the Write Status signal sent back to the CPU must be that which applies to the program under which the original Write Command was issued.

If such is not the case, the returned signal, whether Read data or a Write Status report, may report a fatal error with respect to a program that no longer has control of the CPU at the time the information is returned. Under those conditions, the fatal error report will be attributed to the second program and whatever operation is then in process under the control of the second program, will be incorrectly aborted.

In many prior art devices the problem is solved by arbitrarily inserting a delay prior to switching between successive programs. Thus, if it is determined that under worst case conditions a status report may be returned as much as 50 microseconds after the original request is issued, it is possible to arbitrarily insert a fixed delay interval following each command issued before another program is allowed to take over control of the CPU. With such an arrangement however, flexibility is lost to the extent that situations beyond those normally anticipated cannot be accommodated, except by unduly prolonging the delay interval to allow for a safety margin. Further, system performance is degraded where the mandatory delay interval exceeds, on average, the time interval required for the status to be reported back following a command.

OBJECTS OF THE INVENTION

Accordingly, it is the primary object of the present invention to provide new and improved monitoring apparatus for a data processing system wherein program switching may occur only when a response has been received for all commands issued under the existing program.

It is a further object of the present invention to provide apparatus for monitoring program switching in a data processing system which can flexibly adjust to the varying requirements of the system.

It is a further object of the present invention to provide new and improved apparatus for monitoring the switching of programs in a computer system wherein no degradation of system performance occurs as a result of such monitoring.

These and other objects of the present invention, together with the features and advantages thereof, will become apparent from the following detailed specification when considered in conjunction with the accompanying drawings.

DESCRIPTION OF THE INVENTION

Figure 1:
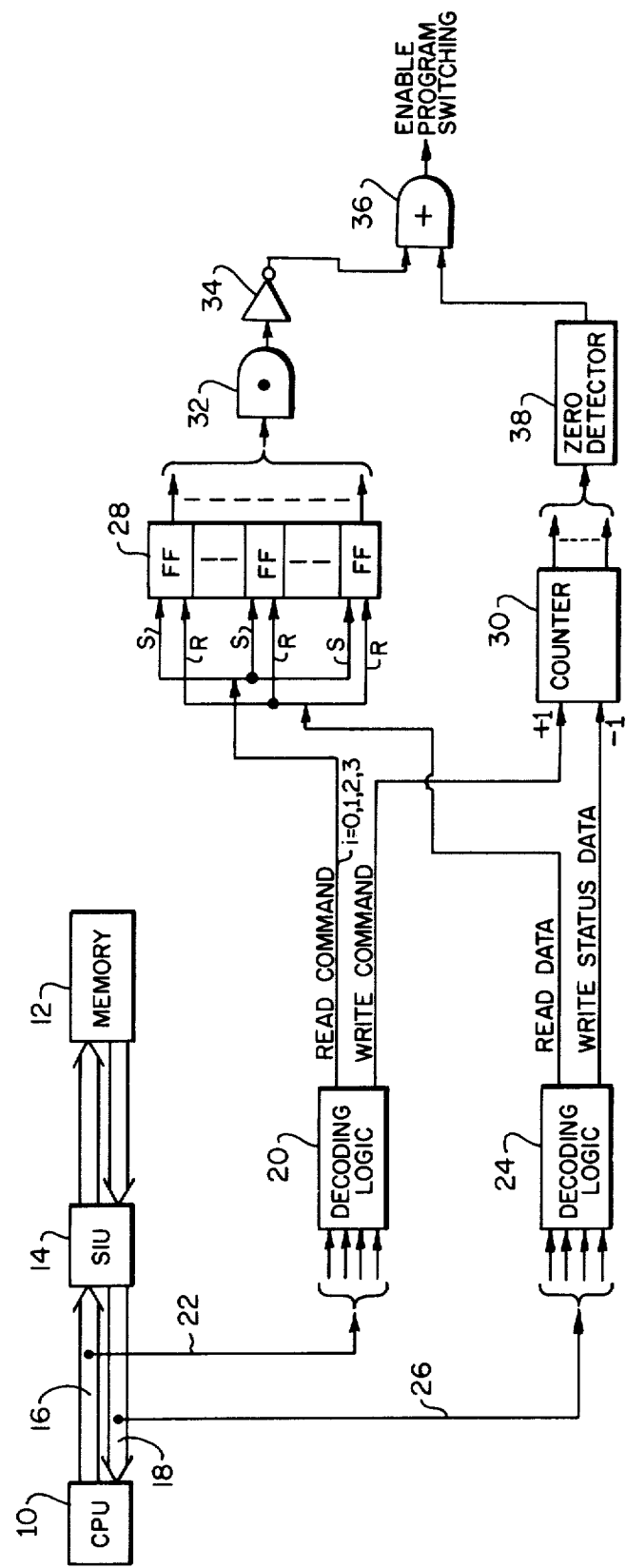
FIG. 1 illustrates in block diagram form a preferred embodiment of the present invention.

With reference now to the drawings, FIG. 1 illustrates a preferred embodiment of the apparatus used in the present invention. A central processing unit 10 communicates with other system components, e.g., with the system memory 12, by way of a system interface unit 14. For further information regarding such system components, reference may be made to U.S. Pat. No. 4,000,487 which issued Dec. 28, 1976. Outgoing commands, i.e. commands addressed by the CPU to the outside world by way of the interface unit 14, are designated by the channel 16. Incoming data which is transmitted to the CPU by way of interface unit 14 is designated by the channel 18.

A decoding logic circuit 20, which monitors the outgoing command traffic in channel 6, is coupled to the latter by means of a channel 22 and the input terminals of unit 20. Similarly, a decoding logic unit 24 has its input terminals connected by way of a channel 26 to channel 18 in order to monitor the incoming data traffic in the latter.

The monitoring circuit of the present invention further includes an indicating unit 28, which is seen to consist of a plurality of flip flops each having a Set and Reset input. Each flip flop further includes a single output, e.g. adapted to provide a "1" signal when the flip flop is in its set state. The circuit also includes a counter 30 having an incrementing input designated +1 and a decrementing input designated −1. The signal provided on a plurality of counter outputs indicates the count.

Decoding unit 20 provides four Read Command signals and a Write Command signal respectively on five outputs. These have been shown as a pair of outputs for case of illustration. As shown in FIG. 1, Read Command $i$ output is coupled to the Set inputs of the $i^{th}$ flip flops of indicating unit 28. The Write Command output is coupled to the incrementing input of counter 30.

Decoding logic unit 24 provides four Read Data signals as well as a Write Status Data signal on five outputs. Read Data output $i$ is coupled to the Reset inputs of the $i^{th}$ flip flops of unit 28 and the Write Status Data output is coupled to the decrementing input of counter 30.

The outputs of the flip flops of indicator 28 are jointly coupled to an OR gate 32. An inverter 32 inverts the output signal of gate 32 and has its own output coupled to one input of an AND gate 36. Another input of gate 36 is coupled to the output of a zero detector 38 which receives the outputs of counter 30. The output signal of gate 36 enables program switching, as will become clear from the explanation of the operation of the circuit below.

In a preferred embodiment of the invention, each data transfer is in the form of a double word. Further, each read command calls for a 4-word block, i.e. for two double words. Under certain conditions, as many as four simultaneous Read Commands may be sent out. Although not illustrated in FIG. 1, the unit 20 requires eight inputs and four Read Command outputs to handle four simultaneous Read Commands. Similarly, for four simultaneous Read Commands each calling for a 4-word block to be read, the indicator 28 will require 8 flip flops, each corresponding to a double word.

Figure 2:
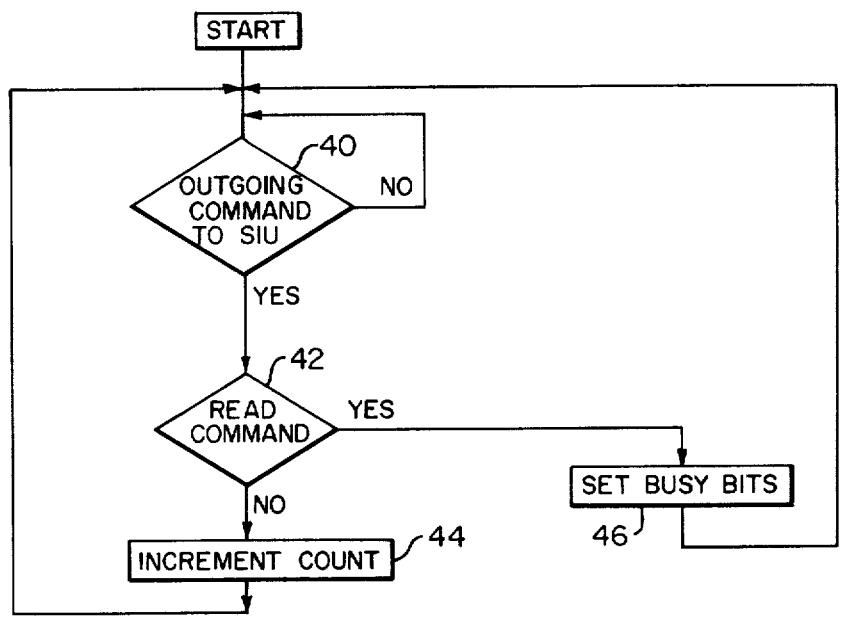
FIG. 2 illustrates in flow chart form the operation of the apparatus of FIG. 1 for outgoing commands.
Figure 3:
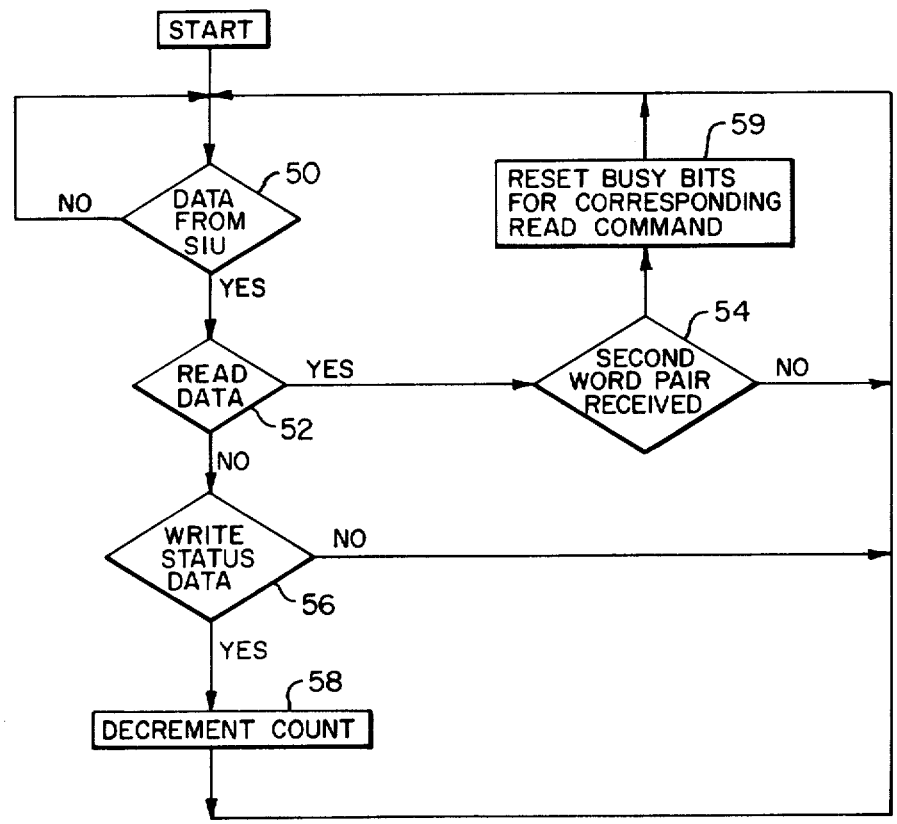
FIG. 3 illustrates in flow chart form the operation of the apparatus of FIG. 1 for incoming data.

The operation of the apparatus of FIG. 1 will be explained with the aid of the flow charts of FIGS. 2–4. FIG. 2 illustrates the operation of the apparatus of FIG. 1 for outgoing commands in channel 16. Each signal directed to another system component by way of the system interface unit 14 is examined to determine whether or not it is an outgoing command. The latter is schematically illustrated in FIG. 2 by decision block 40. If the signal in channel 16 is not an outgoing command, the system returns to its starting condition, as indicated by the "No" output of block 40. If it is an outgoing command addressed to the system interface unit, a determination is made in accordance with block 42 as to whether or not it constitutes a Read Command. In the circuit illustrated in FIG. 1, the appearance of a Read Command signal at the output of the decoding logic unit 20 is indicative of the foregoing determination.

If a Read Command signal has been detected, a Busy Bit is set for each double word of the 4-word block to be read in response to the Read Command. Thus, for each Read Command two Busy Bits are set. The latter is schematically illustrated by block 46 in FIG. 2. Once the Busy Bits are set, the process returns to the start condition, awaiting the next outgoing command. In the apparatus shown in FIG. 1, for each Read Command signal a pair of flip flops will be set in indicator unit 28, each flip flop corresponding to a double word to be read.

If the outgoing command detected is not a Read Command, it must be a Write Command, in which case the existing count is incremented by 1, as shown by block 44 in FIG. 2 and as further illustrated by the coupling of the Write Command output to the incrementing input of counter 30 in FIG. 1. The counter itself is incremented from a predetermined reference count which, in the preferred embodiment of the invention, is conveniently taken to be 0. Once the counter has been incremented, the system returns to the start condition, awaiting the next outgoing command.

For incoming signals from the SIU, as they appear in channel 18, the signals are first examined for the presence of data. This is illustrated in FIG. 3 by decision block 50. If the signal examined is not data, the system reverts to the start condition. If it is data from the SIU, decision block 52 determines whether or not it is Read Data. In the apparatus of FIG. 1, this is carried out by the decoding logic unit 24 which receives data from channel 18 by way of channel 26.

If read data is found to be present, the arrival of the second word pair is awaited. A complete data block must be received, before further action is taken, as shown by decision block 54. If no second word pair appears, the system reverts to the start condition. If a second word pair is received, the action indicated by block 59 takes place. The two Busy Bits that were set for the two double words by setting two flip flops of indicator 28, are now reset and the system reverts back to its start condition. In FIG. 1, this occurs by way of the Read Data signal output of unit 24, which is applied to the Reset inputs of the flip flops of indicator 28.

If no Read Data signal is detected in the data from the SIU, the incoming data is examined for the presence of Write Status data, as schematically shown by decision block 56. If Write Status Data is not found to be present, it means that the data from the SIU was neither Read Data nor Write Status Data, but something else. Under these conditions, the system reverts to its start condition. If Write Status Data was determined to be present, the count is decremented, as shown by block 58, and the system again reverts to the start condition. In the apparatus of FIG. 1, this is shown by the coupling of the Write Status Data output of unit 24 to the decrementing input of counter 30.

Figure 4:
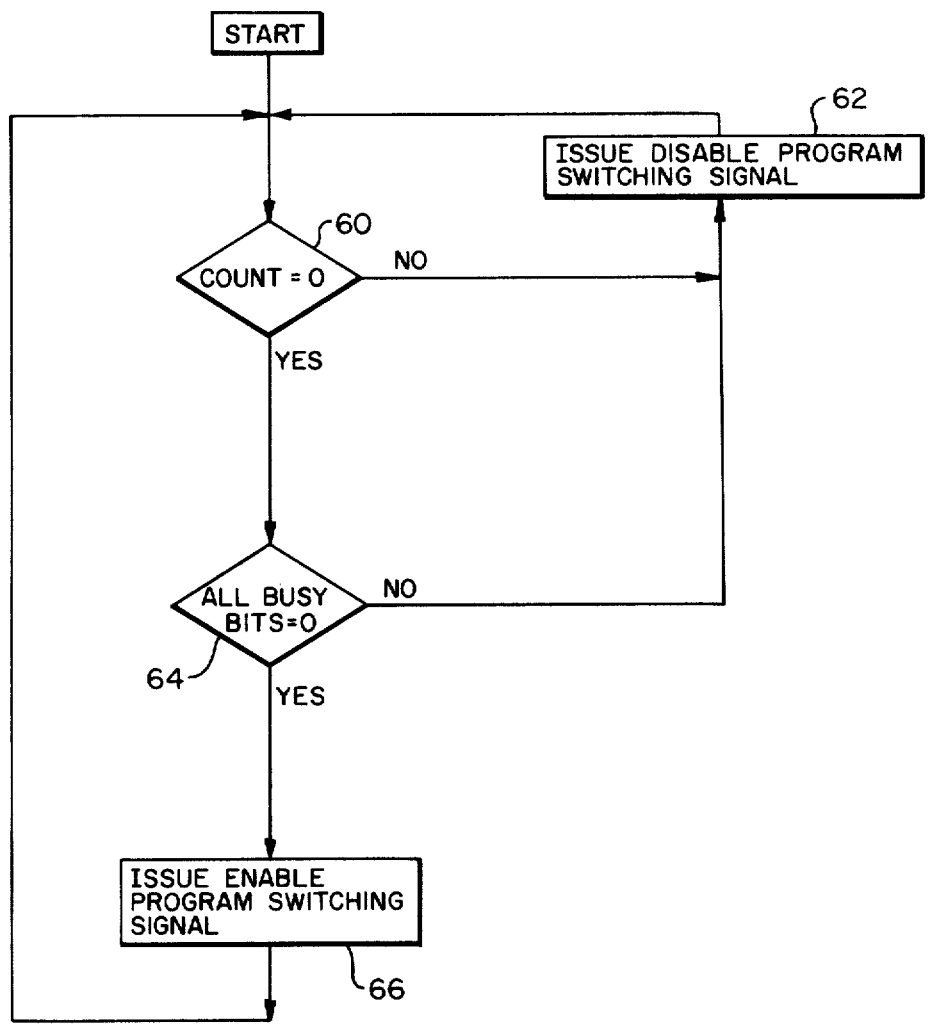
FIG. 4 illustrates in flow chart form the checking operation performed by the apparatus of FIG. 1.

FIG. 4 illustrates the checking operation to determine whether or not program switching is legal. As shown, the count is checked to determine whether or not it is zero (or whatever reference count is adopted.) This is schematically indicated in FIG. 4 by decision block 60. In FIG. 1, this function is performed by zero detector 38, which is connected to the outputs of counter 30. Further, in accordance with decision block 64, a determination is made whether or not all Busy Bits equal 0. In FIG. 1 the outputs of indicator 28 will be at 0 if all the flip flops are in their reset state.

If either the count is not equal to 0, or all Busy Bits are not equal to 0, a Disable Program Switching signal is issued, as shown by block 62. In practice, the absence of an Enable Program Switching signal, as determined at the output of AND gate 36 in FIG. 1, is interpreted as a Disable Program Switching signal. Conversely, if both the count equals 0 and all Busy Bits equal 0, an Enable Program Switching signal is issued, as illustrated by block 66, and the system returns to its start condition. In the apparatus of FIG. 1, AND gate 36 will be rendered conductive by the concurrent application of signals to its inputs only if all flip flops are in a reset state at the same time as counter 30 contains a zero count.

From the foregoing explanation it will be readily apparent that the present invention effectively monitors communications between the central processing unit of a data processing system and other storage devices of the system, such as the memory. This is carried out by monitoring all traffic flowing through the system interface unit through which all communications with the CPU are carried on. Switching out of an existing program that has control of the CPU is possible only when the status of all commands issued under the control of the existing program has been determined. As such, the monitoring apparatus that constitutes the subject matter of the present invention retains maximum flexibility and is capable of allowing for departures from the norm, memory tie up, such as may occur for example when a status response is not received following issuance of a command. Under such conditions, program switching is not permitted. Further, such flexibility is attained without compromising system performance, as it is the case where a fixed delay interval is mandatory for each program switching operation.

From the foregoing explanation, it will be apparent that numerous modifications changes and departures will now occur to those skilled in the art, all of which fall within the scope of the present invention as defined by the appended claims.

What is claimed is:

1. In a data processing system including at least a central processing unit, a memory unit for storing a plurality of computer programs, and an interface unit coupled to said central processing unit and to said memory unit for communicating signals representative of commands, data and status there between a monitoring apparatus coupled to said processing unit and said interface unit for receiving said signals, for reliably switching between computer programs executed by said central processing unit said monitoring comprising:

indicating means including a plurality of flip-flops;
   first decoder means responsive to certain ones of said signals corresponding to outgoing commands coded for specifying transfers of a group of words to be transferred to said interface unit generating signals indicative of the occurrence of read and write commands, said first decoder means being coupled to said indicator means and operative to each signal indicative of a read command to set an individual one of said flip-flops for each double word of a group of words specified by said read command to be read from said memory unit;
   counter means coupled to said first decoder means, said counter means being responsive to each signal indicative of a Write command to increment said counter by one;
   second decoder means responsive to signals received from said interface unit for generating signals indicative of read data signals and write status signals as responses to corresponding ones of said outgoing commands, each pair of said read data signals indicative of completion of a transfer of a group of words read from said memory unit in response to a previously sent read command, said second decoder means being coupled to said indicating means and to said counter, said counter responsive to each occurrence of a write status signal to decrement said counter by one each of said read data signals resetting an individual one of the flip-flops that were set for each double word of said group of words;
   logic means coupled to said indicating means for generating a first output signal indicating when all of said flip flops are in the reset state;
   detector means coupled to said counter for generating a second output signal when said counter is in a zero state; and,
   output means coupled to said logic means and to said detector means responsive upon the concurrence of said first and second output signals to provide an enabling signal for signaling when said central processor could reliably switch programs.

2. In a data processing system including at least a central processing unit, a memory unit for storing computer programs, and an interface unit coupled to said central processing unit and to said memory unit for communicating signals representative of commands, data and status there between a apparatus for preventing premature switching between computer programs by said central processing unit, said apparatus being coupled to said processing unit and comprising:

command decoder means responsive to signals representative of outgoing commands directed to interface unit for transfer to said memory unit to generate read and write signals respectively representative of the occurrence of read and write commands;
   decoder means responsive to signals representative of incoming data and status from said interface unit received from said memory unit to generate read data signals and write status signals respectively in response to said read and write commands;
   storage means coupled to said command decoder means and responsive to each of said read command signals to store a signal indication for each data unit to be read from said memory unit;
   means coupled to said decoder means and to said storage means and responsive to each of said read data signals to reset said signal indication representative of each of said data units corresponding thereto;
   counter means for storing a count indicative of any write commands yet to be responded to by said memory unit;
   means coupled to said command decoder means and to said counter means responsive to each write command signal to increment by one said count;
   means coupled to said decoder means and to said counter means responsive to each write status signal to decrement said count by one;
   means coupled to said storage means for generating a first output signal indicating the absence of any of said stored signal indications;
   means coupled to said counter means for generating a second output signal when said count is at a predetermined value; and,
   means responsive to the concurrence of said first and second output signals to generate an enabling signal permitting program switching.

3. In a data processing system including at least a central processing unit, a memory unit for storing at least instruction of first program, and an interface unit coupled to said central processing unit and to said memory unit for communicating signals representative of data, commands and status there between a apparatus for monitoring switching between computer programs by said central processing unit, comprising:

storage indicating means including a plurality of flip-flops;
   a counter for storing a count indicating any write commands yet to be responded to by said memory unit;
   first decoding means for decoding signals representative of outgoing commands transferred to said interface unit directed to said memory unit by said central processing unit during the execution of instructions of said first program, said first decoding means including first means for signaling the occurrence of read and write commands;

second means coupled to said means for signaling and to said counter and responsive to signals indicating the occurrence of each write command to increment by one said counter;

second decoding means for decoding signals representative of data received from interface unit transferred by said memory unit in response to commands generated during said first program and directed to said central processing unit, said second decoding means including means for generating a signal for each occurrence of a signal indicative of read data and which corresponds to a double word;

third means coupled to said means of said second decoding means and said storage indicating means and responsive to each pair of last recited signals representative of read data and which corresponds to a block of words to reset the flip-flops previously set in response to the read command specifying the reading of said block;

said second decoding means further including means for signaling each occurrence of write status data received from said memory unit;

fourth means coupled to said means of said second decoding means responsive to said last recited signals to decrement said counter by one in response to each occurrence of write status data;

fifth means coupled to said storage indication means for generating a first output signal when all of said flip-flops are in the reset state;

sixth means coupled to said counter for providing a second output signal when said count is zero; and, gating means coupled to be responsive to the concurrence of said first and second output signals for providing an enabling signal permitting reliable switching out of said first program.

4. A method of preventing premature program switching by a CPU operating to generate outgoing read and write commands to a memory unit in response to instructions of a first program for return of data and status signals therefrom, said method comprising the steps of:

(a) storing an indication in a storage unit for each data unit specified to be read by said memory unit in response to each outgoing read command generated by said CPU;

(b) incrementing by one the count of a counter representative of the number of outstanding write commands for each outgoing write command generated by said CPU transferred to said memory unit;

(c) clearing said corresponding indication stored during step (a) for each data unit read from said memory unit in response to the read command corresponding therewith signalled by incoming signals from said memory unit directed to said CPU during the execution of said first program;

(d) decrementing by one said count of said counter for each incoming write status signal directed to said CPU during the execution of said first program; and, (e) generating an output signal by a gating means for enabling the switching by said CPU out of said first program when said counter stores a predetermined count indicating the presence of no outstanding write commands and said storing unit stores no indications signaling the presence of no outstanding read commands.

5. A method of preventing premature program switching in a data processing system including at least a CPU operating under the instructions of a first program, and a memory unit and an interface unit coupled to said CPU and said memory unit for communicating commands, data and status signals there-between, said method comprising the steps of:

detecting the presence of each outgoing command directed to said interface unit for transfer to said memory unit;

generating first and second signals indicating the presence of read and write commands respectively for each outgoing command detected;

storing a busy indication for each double word to be read from said memory unit in response to each of said read commands requiring the reading of a block of words;

incrementing by one a counter in response to said signals generated for each of said write commands each said read command causing the setting of an individual one of the flip-flops for each double word of a block of words which is to be read from said memory unit;

detecting the presence of incoming signals from said memory unit received by said interface unit resulting from read commands generated by said first program;

generating third and fourth signals indicative of the presence of read data signals and write status signals respectively in response to said incoming signals received from said memory unit;

clearing the busy indication stored for each double word in each block designated by the occurrence of a pair of said third signals;

decrementing said counter by one for each write status signal generated; and, generating an output signal by a gating means for enabling the switching of said CPU out of said first program when said counter stores a predetermined count indicating the presence of no outstanding write commands and in the absence of any stored busy indications thereby indicating that all commands have been properly responded to by said memory unit.

* * * * *